(No Model.)
B. LOERY.
COOKING UTENSIL.
No. 597,217. Patented Jan. 11, 1898.
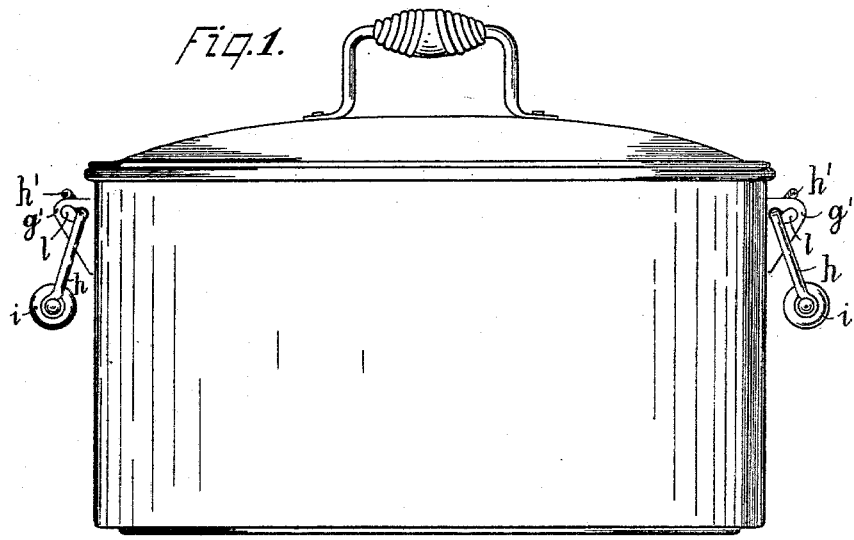
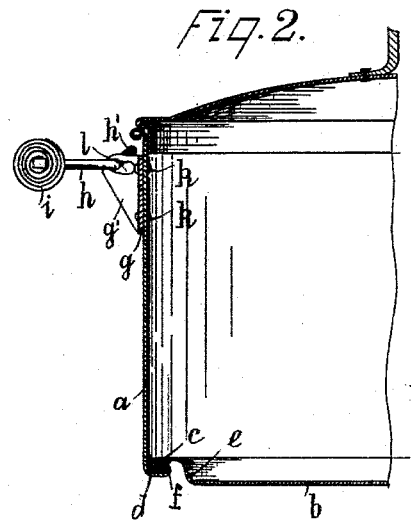
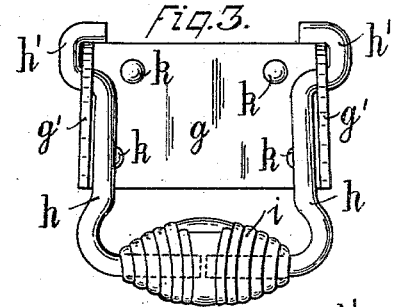
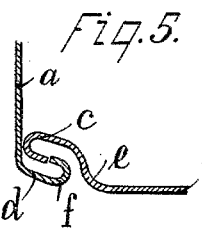
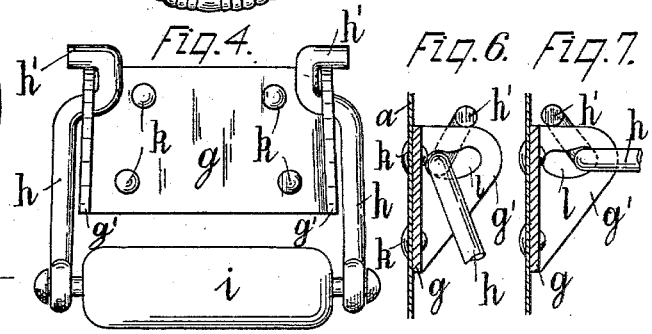
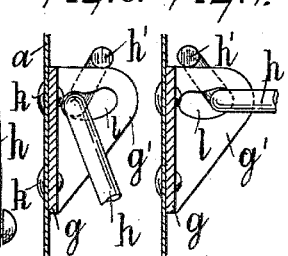
Witnesses
John A. Paulson.
E. C. Nilson.
Bernhard Loery, Inventor
By Schreiter, Van Iderstine & Mathews, his Attorneys.

UNITED STATES PATENT OFFICE.

BERNHARD LOERY, OF NEW YORK, N. Y.

COOKING UTENSIL.

SPECIFICATION forming part of Letters Patent No. 597,217, dated January 11, 1898.

Application filed August 12, 1897. Serial No. 647,974. (No model.)

*To all whom it may concern:*

Be it known that I, BERNHARD LOERY, a subject of the Emperor of Austria, and a resident of New York, county and State of New York, have invented certain new and useful Improvements in Cooking Utensils, of which the following is a full, clear, and exact specification, reference being had to the accompanying drawings, wherein—

Figure 1 is an elevation of my improved washboiler; Fig. 2, a sectional view thereof; Figs. 3 and 4, enlarged views of the handles; Fig. 5, an enlarged detail view showing the joint between the side and bottom of the boiler; Figs. 6 and 7, elevations, partly sectional views, of the handle-braces.

My invention relates to cooking utensils; and it consists of the hereinafter-described construction of a cooking vessel of sheet metal and of the construction of the handles and brackets affixed to the sides thereof.

Cooking utensils with bottoms joined to the hull were heretofore constructed in such manner that their bottoms flanged upward and the hull of the vessel was set within and soldered to the upward-projecting flange. Sometimes this flange is folded and made into a rim running on the outside around the lower edge of the vessel. This is done to make the inside of the vessel free from ridges, but has the disadvantage that the water overrunning the upper edge of the vessel is retained on the ledge and produces corrosion, resulting in the breaking of the vessel in those places when the rust has eaten its way through the body of the metal.

It is desirable that a vessel should be smooth and free from ridges on its inside, so as to prevent the accumulation of any residue therein and to facilitate its cleaning, and my invention tends to provide a vessel having such smooth interior and yet to prevent the disadvantage described above. This object is accomplished by the joint between the side or hull $a$ and the bottom $b$. (Illustrated in the sectional view Fig. 2.) It will be seen that the lower edge of the side $a$ of the vessel is roundly bent at right angles, as shown at $d$, and then again at one hundred and eighty degrees to bring the strip $c$ in parallel position to the strip bent at right angles to the hull. The edge of the bottom part $b$ is bent at nearly right angles at $e$ and then bent back again in parallel position to the bottom $b$, and finally a round bend of one hundred and eighty degrees is made to bring strip $f$ in contraposition with the strip $c$. The bending of the edges is so prepared, as shown in Fig. 5, that the strip $f$ of the bottom edge can pass between the edge of the strip $c$ and the side $a$ of the vessel. When the parts are joined, the joint is compressed, whereby its parts are brought in their final position. (Shown in Fig. 2.) The joint is then soldered between the bend of the strip $f$ and the side $a$ of the vessel and between the strip $c$ and the bottom of the vessel. The bend $e$ of the bottom is made long enough to elevate the joint above the bottom and prevent its being brought into contact with the stove, thus protecting the soldering of the vessel in case the same be left empty thereon.

As apparent from the sectional view, Fig. 2, there is an absolutely tight and smooth joint on the inside of the vessel, and there is no possibility of any moisture being retained or accumulated in any part of the joint, either on the outside or inside of the vessel.

The second feature of my invention is the construction of the handle-brackets $g$ and of the handle-braces $h$, combined therewith, in such manner that the handle $i$ when dropped will not be in contact with the side of the vessel, and thus liable to be heated, and, again, when the handles are taken hold of for the purpose of lifting the vessel the person handling it will have a rigid hold on the same, enabling her to turn the vessel or lift it without the otherwise necessary exertion to stretch the handles apart in order to sustain the vessel in position and prevent her fingers from coming into contact with the sides of the vessel. This is a very important feature of my invention. The handle-brackets $g$ are made of considerably stronger material than the vessel, preferably of sheet-steel, and their lugs $g'$ are bent to project from the vessel parallel to its axis. The plates or backs $g$ are bent in conformity with the hull of the vessel and are affixed thereto by rivets $k$, whose broad heads are soldered on the inside of the hull of the vessel. Their lugs $g'$ are provided with oval slots $l$, wherein the ends of the braces $h$ of the handles are inserted. These ends of the braces may be inserted from the inside or outside, as shown in Figs. 3 and 4. They are bent into hooks $h'$, whose shanks are inserted in the slots $l$ and whose ends are reverted over the edge of the lugs $g'$. These are bent in their axial line at an obtuse angle and act as a clamp or a stud limiting the swing of the braces.

In Fig. 1 the handles of the vessels are shown in their normal position of rest. It will be seen that the handles $i$ are considerably apart from the hull of the vessel and that the hooks $h'$, stemmed against the edges of the lugs and against the edges of the slots $l$, do safely prevent the handle $i$ from coming into contact with the hull. The relative position of the hooks $h'$ and lugs $g'$ in this position of the handle is shown in Fig. 6, whereas in Fig. 7 the position is shown which the braces will assume when the handles $i$ are lifted, as shown in Fig. 2, for the purpose of handling the vessel. It will be seen that in this position the hooks $h'$ are again stemmed against the edges of the lugs $g'$ and their shanks shifted against the opposite ends of the slots $l$. This clamping causes the weight of the vessel to rest on the braces of the handles and on the lugs $g'$. The braces are rigid. The handles might be supported upon the palms of the hands. There is no necessity of stretching apart the handles, nor is there any strain or pressure exerted on the sides of the vessel, twisting out the fastenings, as when the handles are rigidly connected to the sides of the vessel.

I claim as my invention and desire to secure by Letters Patent—

1. The combination with a cooking vessel, composed of a hull and of a bottom joined to the hull, as herein shown and described, of handle-brackets, affixed on opposite sides of the hull, and comprising plates bent in conformity with the shape of the hull and outwardly-projecting lugs with oval-shaped slots in corresponding position; hooked braces, inserted in the slots, and having their ends reverted over the edges of the lugs, and handles secured to the outwardly-projecting ends of the braces.

2. Handle-brackets comprising plates bent in conformity with a vessel, and having outwardly-projecting lugs, with oval-shaped slots in corresponding position, in combination with hooked braces inserted through the slots and having their ends reverted over the edge of the lugs, and handles secured to their other ends.

In witness that I claim the improvements described in the foregoing specification I have signed my name in the presence of two subscribing witnesses.

BERNHARD LOERY.

Witnesses:
HENRY SCHREITER,
ROBERT VAN IDERSTINE.